United States Patent [19]

Kesting

[11] 4,035,459
[45] July 12, 1977

[54] PROCESS FOR SPINNING DRY-FIBER CELLULOSE ACETATE HOLLOW FIBER MEMBRANES

[75] Inventor: Robert E. Kesting, Irvine, Calif.

[73] Assignee: Chemical Systems, Inc., Santa Ana, Calif.

[21] Appl. No.: 573,732

[22] Filed: May 1, 1975

[51] Int. Cl.² ............... B05D 3/00; D02G 3/22
[52] U.S. Cl. ................... 264/49; 8/115.5;
210/500 R; 264/184; 264/187; 264/207; 264/209; 428/398
[58] Field of Search ............... 264/182, 207, 49; 210/500 M; 428/398; 106/176, 196; 8/115.5

[56] References Cited

U.S. PATENT DOCUMENTS

| | | | |
|---|---|---|---|
| 1,707,164 | 3/1929 | Karplus | 264/209 |
| 1,864,006 | 6/1932 | Weingard | 264/209 |
| 2,809,192 | 10/1957 | Sloan et al. | 106/196 |
| 3,592,671 | 7/1971 | Malm et al. | 106/196 |
| 3,674,628 | 7/1972 | Fabre | 264/182 |
| 3,724,672 | 4/1973 | Leonard et al. | 264/41 |
| 3,799,356 | 3/1974 | Salyer et al. | 264/182 |
| 3,884,801 | 5/1975 | Kesting | 264/41 |
| 3,930,105 | 12/1975 | Christen et al. | 264/41 |
| 3,933,653 | 1/1976 | Hashiro et al. | 264/41 |
| Re. 19,329 | 9/1934 | Weingard | 264/209 |

*Primary Examiner*—Jay H. Woo
*Attorney, Agent, or Firm*—Knobbe, Martens, Olson, Hubbard & Bear

[57] ABSTRACT

A dry-wet process for forming interiorly asymmetric hollow fiber cellulose acetate membranes is disclosed.

9 Claims, No Drawings

PROCESS FOR SPINNING DRY-FIBER CELLULOSE ACETATE HOLLOW FIBER MEMBRANES

This invention relates to fiber membranes and, more particularly, to improved fiber membranes suitable for use in kidney dialysis applications and to methods for preparing the same.

Kesting ([1]), incorporated herein by reference, describes many types of membranes and methods of preparation of the same. In Chapter 5, Kesting describes the phase inversion method of membrane formation and gives various examples. Cellulose acetate, cellulose triacetate and other cellulose ester and ether membranes are well known Hollow fiber membranes have been described ([2-7]) and their applications are discussed in considerable detail by Mahon ([3]). One of the important applications of fiber membrane structures is in the field of dialysis. Hollow fiber or capillary artifical kidneys presently available are wet fibers prepared by a melt-spinning process from cellulose triacetate or diacetate. The fibers are subsequently leached and deacetylated. These wet fibers must be kept wet at all times or they lose their asymmetry, and hence their permeability. Furthermore, because deacetylated cellulose triacetate, and diacetate, i.e., cellulose, is biodegradable, wet fibers must be stored in aqueous biocides, such as formalin which leads to substantial difficulties both in the preparation of the fiber membrane for dialysis and in reuse.

Many of the problems inherent in previous processes and hollow fiber membrane products are overcome by the present invention which comprises a combination of wet-dry spinning processes for the preparation of wet-dry reversible asymmetric hollow fiber membranes of cellulose acetate with the skin on the inside of the fiber. In the process of this invention, the inner skin is formed by the gelling action of a non-solvent, as in the wet process, whereas the outer porous support is gelled by the complete evaporation of the solvent system, as in the dry process. These new membranes have very significant advantages over the membranes of the prior art. These capillary membranes are suitable for dialysis, ultrafiltration and other membrane separation processes, such as those described by Mahon ([3]). The membranes are made dry, can be stored in the dry state, can be sterilized in the dry state by ethylene oxide, and the sterility can be maintained by proper packaging. The membranes can be dried and rewet reversibly and, consequently, can be reused a number of times. Unlike the prior art cellulose acetate membranes, which must be kept wet, the membranes of this invention can be stored in the dry condition, used, redried and restored or shipped for later use or use at a different place. These membranes are particularly well adapted to being incorporated into small, portable dialysis, reverse osmosis or other membrane separatory systems which are intended for field use. The membranes have an essentially infinite storage life and are ready for use immediately upon being wet.

The hollow fiber membranes of the invention may be used either as is, i.e. with the skin not hydrolyzed to cellulose, or a caustic solution can be circulated through the fiber to yield a cellulose acetate fiber with a hydrolyzed internal skin of cellulose.

The hollow fiber membrane may be packaged, combined into bundles, or used in any of the known or developed methods for handling fiber membranes generally, such as those described by Hiskey ([2]), Mahon ([3]) and McLain ([5]). The Mahon type device is convenient and is a conventional approach to using hollow fiber membranes; however, there are many modifications and variations of the bundling process which can be used to combine the fiber membranes of this invention into suitable modules or structures for use in separation procedures.

The process of the invention, briefly, comprises extruding a hollow fiber from a spinning solution into a gas phase whereby the outer skin and structure of the fiber is formed by the dry phase inversion process while injecting into the interior of the fiber a core liquid which causes the interior wall of the hollow fiber membrane to gel according to the wet phase inversion process, thus giving an asymmetric dry-wet phase inversion produced membrane. Apparatus generally of the type shown in McLain et al ([6]) may be used. The following examples of the process and the products produced are given by way of illustration and are not limiting to the scope of the invention. The purpose of the examples is to demonstrate the best mode for carrying out the invention presently contemplated by the inventor, recognizing that there are, within the skill of the art, many adaptations and variations which can logically and obviously be made based upon the principles of the invention disclosed herein and known or accepted practices within the art.

The spinning solution includes a polymer, for example, cellulose acetate, e.g. Eastman E-394-60, Eastman E-394-30, Eastman E-394-45, Eastman E-383-40, Eastman E-400-25, or Hercules M-203 Grade Cellulose Acetate having a degree of substitution of about 2.5, generally in the range of 2.3 to 2.7 and a molecular weight greater than about 40,000, and preferably 50,000 or more, are quite satisfactory. Cellulose acetate mixed esters, e.g. propionate, butyrate, isobutyrate, etc., of D.S. 2.3–2.7 and M.W. of 40,000 or higher are generally equivalent.

The second constituent is a solvent. The only satisfactory solvents are methyl formate and propylene oxide, with ethylene oxide being only very marginally usable. The preferred solvents are methyl formate and propylene oxide. These two solvents are the only strong solvents for cellulose acetate which boil within 10° C. of ambient temperature and which are fully satisfactory for the present system. No solvent other than those referred to is usable in any practical application of this invention.

The third constituent is the pore producing substance, sometimes referred to as the swelling agent or the non-solvent. In this process, the only swelling agents which have been found to be satisfactory are t-butanol and isopropanol, with ethanol being marginally satisfactory. These three alcohols are the only swelling agents which boil approximately 30° C. higher than the solvents, this being a prerequisite to a practical spinning solution in this invention, and which are additionally sufficiently volatile to dry quickly enough to permit practical application of the method described here.

A fourth constituent which may be desirable to give good flexibility is a plasticizer, the preferred plasticizer being glycerol. If more rigid fibers are desired, the plasticizer may be omitted entirely.

The fifth constituent is the core liquid. Ethanol and isopropanol are the preferred core liquids. Methanol has been found to be unsatisfactory. Insofar as the system has been presently developed, the only fully satisfactory core liquids are ethanol and isopropanol but other polar organic solvents having comparable vapor pressure may be found to be equivalent.

A typical formulation may comprise from 20 to 25 grams of the polymer, e.g. Eastman E-200-25, 60 ml. of methyl formate, 50 to 70 g. and preferably 55 to 60 g. of t-butanol, and 0 to 5 g. of glycerol. In terms of actual concentration, there is considerable area for adaptation to particular spinning conditions, equipment, etc. For example, there is no particular criticality to the concentration range of the polymer and the spinning solution although a concentration of 20± 15%, preferably 20± 10%, is usually a satisfactory range. The pore producing substance may vary from nearly 0 to amounts equal to or greater than the amount of solvent for the membrane forming polymer.

The spinning solution is filtered through a 5 micron filter and spun through a spinerette consisting of an outer orifice through which the solution flows and an inner hollow needle through which the core liquid non-solvent flows. The hollow fiber solution gels almost immediately on its outer surface, because of the rapid loss of solvent through evaporation, and on its inner surface, because of the skin formed by the precipitating action of the core liquid non-solvent. As the hollow fiber is formed, it descends to and is supported on a continuous carrier belt where it dries virtually to completion before being taken up on spools using standard textile pick-up equipment.

EXAMPLE 1

A spinning solution of 20 parts Eastman E-394-60, 60 parts of methyl formate and 64 parts of ispropyl alcohol was spun using ethanol as the core liquid to a 0.025 inch inside diameter, 0.030 inch outside diameter, hollow fiber membrane and the internal skin was hydrolyzed by circulating a 0.4 molar sodium hydroxide solution through the fibers for 7.5 minutes, then flushing the fibers with water. All parts are by weight.

The process yielded a hollow fiber membrane which had an ultrafiltration rate of 3.3 cm/hr. mm Hg $\times 10^{-4}$ with a Vitamin B12 dialysis permeability of 26.5 cm/min. $\times 10^{-4}$ and a creatinine dialysis permeability of 170 cm/min. $\times 10^{-4}$.

EXAMPLE 2

A spinning solution of 21 parts of Eastman E-394-60 cellulose acetate dissolved in 60 g. of methyl formate mixed with 60 g. of t-butanol and 2 g. of glycerol was spun using ethanol as the core liquid to a 0.026 inch inside diameter and a 0.029 inch outside diameter, potted with polyurethane into a fiber bundle and placed in a cylinder to form a test element.

The ultrafiltration test element had an ultrafiltration rate of 90 cm/hr. mm Hg $\times 10^{-4}$ with a Vitamin B12 dialysis permeability of 47 cm/min. $\times 10^{-4}$ and a creatinine dialysis permeability of 144 cm/min. $\times 10^{-4}$. This hollow fiber membrane was utilized as produced without hydrolysis.

EXAMPLE 3

22 parts of Eastman E-394-60 was dissolved in 60 g. of methyl formate and the solution mixed with 66 g. of t-butanol and 1 g. of glycerol. The liquid was spun through a spinerette in a manner described, using ethanol as the core liquid to form a 0.013 inch inside diameter and a 0.023 inch outside diameter hollow fiber membrane, segments of which were bundled to form a test element as described in Example 2.

The ultrafiltration was 165 cm/hr. mm Hg $\times 10^{-4}$ with a Vitamin B12 dialysis permeability of 100 cm/min. $\times 10^{-4}$ and a creatinine dialysis permeability of 144 cm/min. $\times 10^{-4}$.

EXAMPLE 4

25 grams of Eastman E-394-60 cellulose acetate was dissolved in 60 g. of propylene oxide and the resulting solution mixed with 55 g. of isopropanol and 2 g. of glycerol. A hollow fiber membrane was spun using isopropanol as the core liquid to an inside diameter of 0.015 inch and an outside diameter of 0.023 inch and formed into a test element as described above.

The ultrafiltration rate was 20 cm/min. $\times 10^{-4}$ with Vitamin B12 dialysis permeability of 50 cm/min. $\times 10^{-4}$ and a creatinine dialysis permeability of 100 cm/min. $\times 10^{-4}$.

This invention constitutes the first time that a dry spun asymmetric hollow fiber has been accomplished. The asymmetry wherein the inside surface of the hollow fiber membrane is produced by the wet phase inversion process and the remainder of the membrane is produced by the dry phase inversion process results in a new result and a new product not previously known which possesses significant and important advantages over previously known membranes. Membrane separatory systems made using the membranes of this invention can be stored dry, are wet-dry reversible, can be sterilized in the dry condition and stored in sterile packages indefinitely, are ready for use without preliminary flushing to remove preservatives, have an usually high ultrafiltration capability, have a greater permeability of intermediate molecular weight molecules than has been accomplished heretofore, permit more reproducable results than has been accomplished using membranes of the prior art, are capable of being used as spun or with the interior wall hydrolyzed to cellulose, and can be manufactured with thinner walls and larger passages, to enumerate a few of the advantages over the prior art.

In the preceding description, the exemplary embodiments and examples have been oriented toward the use of the membranes in hemodialysis, artifical kidney applications, and the like, but the processes and the product are equally applicable to membranes for reverse osmosis separations and other membrane separatory processes and structures.

The process can be modified to permit removal of the core non-solvent, for example by flushing, with a more volatile liquid, in which case the non-solvent vapor pressure is less critical.

The invention encompasses both the process and the product and the scope of the invention is not limited to the preceding examples but only by the principle of the invention as defined in the claims set forth hereinafter.

REFERENCES CITED IN THE SPECIFICATION (1) Kesting, R.E. SYNTHETIC POLYMERIC MEMBRANES, McGraw-Hill, New York, 1971.
(2) Hiskey, C.F., U.S. Pat. No. 2,864,506.
(3) Mahon, H.I., U.S. Pat. No. 3,228,876.
(4) McLain, E.A., et al, U.S. Pat. No. 3,423,491.
(5) McLain, E.A., U.S. Pat. No. 3,422,008.
(6) McLain, E.A., et al, U.S. Pat. No. 3,659,983.
(7) Bandel, Werner, "Developments in the Field of Cupraphan Membranes and Hollow Fibers," delivered at the 7th Working Session of the Working Group for Clinical Nephrology, Hamburg, Germany, June 14, 1974 (Enka-Glanstoff, A.G., Wuppertal-Barman, Germany).

What is claimed is:

1. A dry phase inversion process for forming asymmetric wet-dry reversible hollow fiber membranes comprising extruding a polymer containing spinning solution in the form of a hollow fiber into an evaporation promoting gas phase to thereby form a membrane wall by the dry phase inversion process without liquid bath coagulation of the external membrane wall with a coagulating bath and injecting into the hollow passage therein a non-solvent for the polymer to thereby form the interior of the membrane by the wet phase inversion process.

2. A hollow fiber membrane forming process comprising the steps of:

extruding into an atmosphere which promotes rapid evaporation the outer surface of hollow fiber configured membrane forming solution containing a polymer dissolved in a solvent for the polymer and mixed with a non-solvent for the polymer to thereby form a membrane structure on the outer surface of a hollow fiber by the dry phase inversion method;

simultaneously contacting the interior surface of the extruded hollow fiber configured spinning solution with a non-solvent for the polymer therein with a non-solvent for the polymer to thereby form a membrane structure on the interior surface of the hollow fiber by the wet phase inversion method; and evaporating substantially all liquids from the membrane to thereby form a dry asymmetric membrane having different pore structures at the respective surfaces by reason of the two methods of membrane formation of the respective surfaces.

3. The process defined in claim 2 wherein the interior hollow passage is substantially filled with a non-solvent liquid for the polymer.

4. The process defined in claim 3 wherein the polymer is cellulose acetate, the solvent is methyl formate, propylene oxide or ethylene oxide, the non-solvent in the spinning solution is t-butanol, isopropanol or ethanol and the non-solvent injected into the fiber passage is ethanol or isopropanol.

5. The process defined in claim 4 wherein the cellulose acetate has a degree of substitution of from about 2.3 to about 2.7 and a molecular weight of about 40,000 or more, the solvent is methyl formate or propylene oxide, the non-solvent in the spinning solution is t-butanol or isopropanol and the non-solvent injected into the fiber passage is ethanol or isopropanol.

6. The process defined in claim 5 wherein the spinning solution includes a plasticizer for cellulose acetate.

7. The process defined in claim 6 wherein the solvent is methyl formate, the non-solvent injected into the passage of the fiber is ethanol, the plasticizer is glycerol and the cellulose acetate has a molecular weight of about 50,000 or more.

8. The process defined in claim 4 including the further step of hydrolyzing the surface of the fiber passage.

9. The process defined in claim 3 including the further step of modifying the surface of the fiber passage by flowing a solution which is chemically reactive with the membrane polymer through the passage.

* * * * *